United States Patent [19]

Foucht

[11] Patent Number: 5,011,902

[45] Date of Patent: Apr. 30, 1991

[54] CO-CATALYST SYSTEM FOR PREPARING POLYURETHANE BASED PLYWOOD-PATCH COMPOSITIONS

[75] Inventor: Millard E. Foucht, Stone Mountain, Ga.

[73] Assignee: Georgia-Pacific Resins, Inc., Atlanta, Ga.

[21] Appl. No.: 430,048

[22] Filed: Nov. 1, 1989

[51] Int. Cl.$^5$ ............................................. C08G 18/22
[52] U.S. Cl. ........................................ 528/55; 502/102; 502/170; 528/57
[58] Field of Search ............... 528/55, 57; 502/102, 502/170

[56] References Cited

U.S. PATENT DOCUMENTS

| | | | |
|---|---|---|---|
| 1,878,962 | 9/1932 | Meidert | 528/57 |
| 3,164,557 | 1/1965 | Merten et al. | 528/57 |
| 3,203,932 | 8/1965 | Frisch et al. | 528/55 |
| 3,245,957 | 4/1966 | Hindersinn et al. | 528/57 |
| 3,245,958 | 4/1966 | Hindersinn et al. | 528/55 |
| 3,407,153 | 10/1968 | Bowman et al. | 528/55 |
| 3,450,653 | 6/1969 | McCellan et al. | 528/57 |
| 3,583,945 | 6/1971 | Robins | 528/57 |
| 3,592,787 | 7/1971 | Robins | 528/55 |
| 3,691,135 | 9/1972 | Schulze et al. | 528/55 |
| 3,714,077 | 1/1973 | Cobbledick et al. | 528/57 |
| 3,725,355 | 4/1973 | Parrish et al. | 528/55 |
| 3,799,898 | 3/1974 | Lamplugh et al. | 528/55 |
| 3,801,532 | 4/1974 | Olstowski | 528/57 |
| 3,901,852 | 8/1975 | Shah | 528/57 |
| 3,912,516 | 10/1975 | Recchia et al. | 528/57 |
| 3,929,732 | 12/1975 | Shah | 528/57 |
| 3,957,753 | 5/1976 | Hostettler et al. | 528/55 |
| 4,000,103 | 12/1976 | Olstowski | 528/55 |
| 4,000,104 | 12/1976 | Olstowski | 528/57 |
| 4,001,165 | 1/1977 | Olstowski | 528/55 |
| 4,067,844 | 1/1978 | Barron et al. | 528/55 |
| 4,115,301 | 9/1978 | Kennedy | 528/57 |
| 4,189,541 | 2/1980 | Ohashi et al. | 528/55 |
| 4,284,751 | 8/1981 | Hutt et al. | 528/55 |
| 4,296,172 | 10/1981 | Hill | 528/55 |
| 4,306,052 | 12/1981 | Bonk et al. | 528/57 |
| 4,321,333 | 3/1982 | Alberino et al. | 528/57 |
| 4,349,663 | 9/1982 | Barsa et al. | 528/57 |
| 4,374,210 | 2/1983 | Ewen et al. | 528/55 |
| 4,385,133 | 5/1983 | Alberino et al. | 528/57 |
| 4,410,689 | 10/1983 | Barsa et al. | 528/55 |
| 4,412,033 | 10/1983 | LaBelle et al. | 528/55 |
| 4,426,485 | 1/1984 | Hoy et al. | 528/57 |
| 4,448,816 | 5/1984 | Barsa et al. | 528/57 |
| 4,452,829 | 6/1984 | Smith | 528/55 |
| 4,468,478 | 8/1984 | Dexheimer et al. | 528/55 |
| 4,497,913 | 2/1985 | Raes et al. | 528/55 |
| 4,584,362 | 4/1986 | Leckart et al. | 528/57 |

FOREIGN PATENT DOCUMENTS

| | | |
|---|---|---|
| 40469 | 11/1981 | European Pat. Off. . |
| 2309535 | 8/1974 | Fed. Rep. of Germany . |
| 1294010 | 4/1962 | France . |
| 1317150 | 12/1962 | France . |
| 994348 | 6/1965 | United Kingdom . |
| 1107480 | 3/1968 | United Kingdom . |

OTHER PUBLICATIONS

J. W. Britain et al., "Catalysis of the Isocyanate-Hydroxyl Reaction", Journal of Applied Polymer Science IV, pp. 207–211, (1960).

N. Irving Sax, "Dangerous Properties of Industrial Materials", Sixth Edition, p. 496, (1984).

The Merck Index, 10th Edition, p. 178, (1983).

J. D. Arenivar, "Bismuth Carboxlates for Polyurethane Catalysts", 32nd Annual Polyurethane Technical/Marketing Conference, pp. 623–627, Oct. 1–4, 1989.

A. R. Leckart et al., "New Catalyst for Two-Component Elastomer Systems", found in Journal of Elasters and Plastics, vol. 19–Oct. 1987, pp. 313–324.

Dabco, K-15 and T-45 Catalyst from Air Products and Chemicals, Inc., "Product Bulletins" & MSD Sheet for K-15.

Fomrez EC-683, EC-686, and EC-688 available from WITCO Chemical Corporation, "Product Bulletins".

*Primary Examiner*—Maurice J. Welsh

[57] ABSTRACT

A plywood-patching composition is provided based on a non-cellular polyurethane elastomer prepared by reacting a polyether or polyester polyol with a polyisocyanate in the presence of a catalytic amount of a co-catalyst system comprising an organo-bismuth compound, preferably a bismuth salt of a carboxylic acid, and at least one organo-metallic compound, preferably a metal salt of a carboxylic acid, wherein the metal is selected from the group consisting of zinc, antimony and lithium and wherein the bismuth and metal are present in an effective mole ratio; and process for preparing same. The catalysts utilized are relatively non-toxic, yet they promote rapid polymerization with essentially no foaming for a wide variety of non-cellular polyurethane elastomeric applications, particularly in plywood-patch applications where even small amounts of foaming are deleterious to the properties thereof.

50 Claims, No Drawings

CO-CATALYST SYSTEM FOR PREPARING POLYURETHANE BASED PLYWOOD-PATCH COMPOSITIONS

FIELD OF THE INVENTION

This invention relates to polyurethanes and more particularly it relates to non-cellular polyurethanes prepared utilizing a catalytic amount of a co-catalyst system comprising an organo-bismuth compound, preferably a bismuth salt of a carboxylic acid, and at least one organo-metallic compound, preferably a metal salt of a carboxylic acid, wherein the metal is selected from the group consisting of zinc, antimony and lithium and wherein the bismuth and metal are present in an effective mole ratio, such polyurethanes being particularly useful in plywood-patch compositions.

BACKGROUND OF THE INVENTION

Urethane polymers or polyurethanes are a large family of polymers with widely varying properties and uses, all based on the reaction product of an organic isocyanate with compounds containing a group with an active hydrogen, such as a hydroxyl group. Polyurethane polymers are generally classified into two broad categories. A. foam or urethane foam, and B. elastomers or polyurethane elastomers. Polyurethane foams are polyurethane polymers produced by the reaction of polyisocyanates with a hydroxyl group from a polyol and a polymerization catalyst, in the presence of water and/or an auxiliary blowing agent, such as monofluorotrichloromethane, which allows the polymeric mass to expand into a cellular mass upon reaction. In preparing a non-cellular polyurethane elastomer, no blowing agent or mechanism for producing gas which would lead to cell development should be present. Therefore, the polymer is produced by the reaction of the isocyanate with a hydroxyl group to form urethane linkages in the presence of a polymerization catalyst.

Polyurethane elastomers have been widely used in a variety of applications. They have been used as protective coatings, in the insulation of electrical elements, as caulks, sealants, gaskets, etc. Because of favorable rheology of an elastomer formulation, they can be used to cast intricate forms such as found in the toy industry. They have also been widely used in the preparation of sporting goods, fabric coatings and shoe soles wherein the cured urethane elastomer comes in repeated intimate contact with human beings. The prior art catalysts used to prepare non-cellular elastomers frequently contained toxic mercury and lead compounds and the toxicity was carried over into the cured elastomer. If less toxic organo-tin compounds are employed as catalysts, elastomers having physical properties less than optimum are often obtained.

There are several patents relating to various catalysts for reacting isocyanates with polyether polyols. U.S. Pat. No. 3,245,957 to Hendersinn et al. describes a process for reacting an isocyanate with an active hydrogen compound in the presence of an antimony containing catalyst.

U.S. Pat. No. 3,203,932 to Frisch et al. relates to a process for preparing urethane-urea elastomers using metal organic catalysts such as lead, cobalt and zinc naphthenates.

U.S. Pat. No. 4,468,478 to Dexheimer et al. discloses polyurethanes prepared from polyoxyalkylenes containing alkali metal or alkaline earth metal catalyst residues chelated with benzoic acid derivatives.

U.S. Pat. No. 3,714,077 to Cobbledick et al. relates to a urethane foam catalyst system consisting of a combination of polyol-soluble organic stannous compounds with polyol-soluble organic bismuth and/or antimony compounds with certain sterically hindered tertiary amines.

U.S. Pat. Nos. 3,801,532, 4,000,103, 4,000,104 and 4,001,165 to Olstowski disclose rapid-setting polyurethanes prepared from diols and polyfunctional isocyanates using organo-metal compounds of tin, zinc, lead, mercury, cadmium, bismuth, cobalt, manganese, antimony and iron, such as stannous octoate, manganese octoate, lead octoate, and dibutyl tin dilaurate.

U.S. Pat. No. 4,584,362 to Leckart et al. relates to polyurethane elastomers prepared utilizing as the sole catalyst therein a bismuth salt of a carboxylic acid having from 2 to 20 carbon atoms.

U.S. Pat. No. 4,452,829 to Smith discloses a sprayable polyisocyanate composition prepared by reacting MDI with a triol and a diol utilizing potassium octoate as a trimerization catalyst and an amine-type heat-activated catalyst and, optionally, a tetravalent-tin urethane-type catalyst to provide a solid, coating or foam.

Non-cellular polyurethanes are also used in plywood-patch applications to fill crevices, voids and other imperfections that occur during the manufacture of plywood. Polyurethanes are well suited for such applications because the isocyanates thereof have a natural affinity for wood. Typically, these compositions are applied in an assembly line fashion, thereby requiring a rapid cure at room temperature (generally less than one minute).

Currently, many formulations for this application employ organo-lead catalysts. However, concern over their toxicity has spurred the search for effective, non-toxic, alternative catalysts. Organo-mercury catalysts are too sluggish and are also toxic. Organotins and tertiary amines have a propensity to react with water causing foam formation which would affect the adhesion of the patch to the plywood and the mechanical properties, e.g. hardness, of the patch. As indicated by A. R. Leckart and L. S. Slovin in their article "New Catalyst for Two-Component Elastomer Systems," Journal of Elastomers and Plastics, vol. 19, pages 313–324 (1987), organo-bismuth catalysts appear to hold some promise in this regard, but are about 3 to 5 times more expensive than lead-based catalysts. Additionally, use of organo-bismuth catalysts in plywood-patch compositions as a sole catalyst is not desirous due to the fast rate of gelation achieved which adversely affects the flowability of the precured composition through the delivery equipment and onto the panel.

Organo-potassium catalysts are a very active species of catalyst, but they have a great affinity for water (hygroscopic) and also a propensity to react with water causing foam formation. Additionally, during their formation, water is produced which is typically not removed due to handling considerations. When the water of reaction is removed, such catalysts become too viscous and even become solid as in the case of potassium octoate, thereby presenting a handling problem. As such, organo-potassium catalysts are typically relegated to the production of foams or applications where foaming is not detrimental thereto. However, there is presently a commercially available plywood-patch composition which appears to be utilizing a potassium-based catalyst believed to be potassium octoate. As to be expected, the patch exhibits slight foam formation due to water contained therein which is sufficient to significantly impair the properties thereof, particularly adhesion, hardness and cure time.

SUMMARY OF THE INVENTION

Accordingly, the present invention relates to a plywood-patch composition based on non-cellular polyurethane elastomers prepared by reacting polyether or polyester polyols having molecular weights of between about 1000 and about 10,000, optionally in conjunction with a smaller percentage of lower molecular weight glycols, which provides for a balance of physical properties required, with an organic polyisocyanate, wherein the ratio of NCO groups to hydroxyl groups is greater than 1.00 to 1, preferably from greater than 1.00 to 1 to about 2.0 to 1, in the presence of a catalytic amount of a co-catalyst system comprising an organo-bismuth compound, preferably a bismuth salt of a carboxylic acid having from 2 to about 20 carbon atoms in the molecule, and at least one organo-metallic compound, preferably a metal salt of a carboxylic acid having from 2 to about 20 carbon atoms in the molecule, wherein the metal of the organo-metallic compound is selected from the group consisting of zinc, antimony, lithium and combinations thereof and wherein the bismuth and metal are present in an effective mole ratio of bismuth to metal. The catalytic amount of the co-catalyst system is preferably from about 0.1 to about 3 percent by weight (% w), more preferably at about 0.2 to about 1.5% w, based on the weight of the polyurethane reactants. The effective mole ratio of bismuth to zinc is from about 1:4 to about 1:1 (bismuth:zinc). The effective mole ratio of bismuth to antimony is from about 1:1.1 to about 1:0.4 (bismuth:antimony). The effective mole ratio of bismuth to lithium is from about 1:6.6 to less than about 1:1.6 (bismuth:lithium). Each of the catalysts in the co-catalyst system may be dissolved in a suitable solvent forming a catalyst solution prior to incorporation into the plywood-patch composition or polyurethane elastomer formulation.

DESCRIPTION OF THE INVENTION

The catalysts utilized in the co-catalyst system of the instant invention are organo-metallic compounds, for example, metal salts of carboxylic acids, metal alcoholates, metal phenolates and metal oximes, wherein the metal is bismuth, zinc, antimony and/or lithium, and may be prepared by any known method. Metal salts of carboxylic acids are preferred and may be produced, for example, by reacting a metal-containing base with a carboxylic acid having 2 to 20 carbon atoms in the molecule, preferably 6 to 16 carbon atoms in the molecule and more preferably 8 to 12 carbon atoms in the molecule, wherein the metal is bismuth, zinc, antimony and/or lithium. Useful carboxylic acids are represented by the formula RCOOH wherein R is a hydrocarbon radical containing 1 to about 19 carbon atoms. R can be alkyl, cycloalkyl, aryl, or alkylaryl, such as methyl, ethyl, propyl, isopropyl, neopentyl, octyl, neononyl, cyclohexyl, phenyl, tolyl or naphthyl. R is preferably alkyl or cycloalkyl, more preferably alkyl. See for example U.S. Pat. Nos. 4,584,362 (bismuth catalysts); 3,245,958 (antimony catalysts); and 3,714,077 (bismuth and antimony catalysts). Metal alcoholates are disclosed in U.S. Pat. Nos. 3,245,957 (antimony catalysts); 3,407,151 (antimony and bismuth catalysts); and 3,714,077 (antimony and bismuth catalysts). The individual catalysts are also available commercially.

The primary use of the co-catalyst system is to accelerate the reaction between the isocyanate and the hydroxyl groups. The co-catalyst system can be employed in a wide range of non-cellular elastomer formulation systems where reduced catalyst toxicity is desirable, particularly plywood-patch applications. The co-catalyst system provides an alternative to the use of catalysts based on lead, tin or mercury with respect to reduced catalyst toxicity and to the sole use of bismuth-based catalysts with respect to reduced costs and improved flowability.

Catalysts in use prior to this invention all had the capability of promoting reaction between a hydroxyl group and isocyanates to produce urethane linkages and, ultimately, polyurethane products. The major disadvantage of organo-mercury based catalysts is that, as supplied, they must be handled with extreme caution due to their classification as poisons and the shipping containers must be managed under the Resources Conservation and Recovery Act as hazardous waste. Organo-lead catalysts must also be handled with a great deal of caution due to their toxicity classification as a hazardous substance under the Resources Conservation and Recovery Act. Organo-antimony catalysts must also be handled with caution due to their toxicity classification as a hazardous chemical by OSHA. At levels of less than 1 percent by weight antimony, polyurethanes are considered safe but such levels are not useful for plywood-patch applications due to slow reactivity. Organo-antimony catalysts also tend to promote the water/isocyanate reaction.

Primarily due to these considerations of toxicity and handling, the use of organo-tin catalysts in non-cellular urethane systems has occurred. As a class, organo-tin compounds do not provide the same type of catalytic performance as organo-mercury and organo-lead compounds, since organo-tin compounds also promote the reaction between moisture and isocyanates in addition to the hydroxy group-isocyanate reaction. The nonspecific nature of the tin catalysts makes their use difficult, with the processor required to go to extreme measures to reduce the presence of moisture in the reactants and other ingredients utilized therein in order to eliminate bubbling or pinhole formation in the elastomers obtained.

In addition, when using catalysts based on mercury, lead or tin, monitoring of the work place environment must be done in order to ascertain ambient air quality compliance with Occupational Safety and Health Administration Standards ("OSHA"). Only general ventilation is required when using catalysts based on antimony.

The co-catalyst system of this invention provides optimum performance based on flowability, tailored gel times, adhesion, and hardness in plywood-patch applications and will not contribute to embrittlement of the cured elastomer. As a precautionary measure, a desiccant such as molecular sieve may be added to the formulation in amounts effective for eliminating, or at least minimizing, any foaming that may occur. Most importantly, the co-catalyst system has an excellent acute toxicity profile. No occupational exposure limit standard must be met when using the co-catalyst system and only general ventilation is required.

It is apparent, therefore, that, when contrasted with organo-mercury compounds and lead salts of organic acids, the co-catalyst system of this invention is much less toxic. The toxicity profiles of organo-tin based chemicals are somewhat poorer, but within about the same order of magnitude as the compounds of this invention, but when considering their limitations based on moisture sensitivity and OSHA monitoring requirements, the safety and ease of use of the compounds of this invention are evident. The toxicity profiles of organo-bismuth based chemicals are within about the same order of magnitude as the compounds utilized herein, but are also about 2 to 4 times more expensive than the co-catalyst system utilized herein since the organo-bismuth catalyst is not used as the sole catalyst.

The primary hydroxy containing reactants used in the preparation of the polyurethane elastomers utilized in the plywood-patch compositions embodying the present invention are primary and secondary hydroxy terminated polyalkylene ethers and polyesters having from 2 to about 4 hydroxyl groups and a molecular weight of from about 1000 to about 10,000. They are liquids or are capable of being liquified or melted for handling.

Examples of polyalkylene polyols include linear and branched polyethers having a plurality of ether linkages and containing at least 2 hydroxyl groups and being substantially free from functional groups other than hydroxyl groups. Typical examples of the polyalkylene polyols which are useful in the practice of the invention are the polyethylene glycols, polypropylene glycols and polybutylene ether glycols. Linear and branched copolyethers of ethylene oxide and propylene oxide are also useful in preparing the elastomers of this invention. Those having molecular weights of from about 1000 to about 5000 are preferred. Polyethers having a branch chain network are also useful. Such branch chain polyethers are readily prepared from alkylene oxides and initiators having a functionality greater than 2.

A variety of poly(oxyalkylene) polyols are available commercially with an exemplary list provided in Table A below:

TABLE A

| Commercial Prod. | Avg. hydroxyl no. | Molecular Wt. | $f^a$ | Mfgr[b] |
|---|---|---|---|---|
| Niax LHT-112 | 112 | 1500 | 3 | UCC |
| Niax LHT-67 | 67 | 2000 | 3 | UCC |
| Niax 11-34 | 34 | 4800 | 3 | UCC |
| Thanol SF-1502 | 112 | 1500 | 3 | ARCO |
| Voranol 2228 | 28 | 2715 | 3 | Dow |
| Voranol 15096.0L | 112 | 1500 | 3 | Dow |
| XVR 1663-40557-23 | 110 | 1500 | 3 | Dow |
| Voranol 4815 | 28 | 6000 | 3 | Dow |
| Voranol 2140 | 28 | 4000 | 2 | Dow |
| Voranol 2012 | 94 | 1200 | 2 | Dow |
| Voranol 2120 | 56 | 2000 | 2 | Dow |
| Voranol 2100 | 56 | 3000 | 3 | Dow |
| Fomrez X6017-183 | 140 | 1600 | 4 | Witco |
| Fomrez ET 1500 | 112 | 1500 | 3 | Witco |
| Fomrez 6017-133 | 60 | 3740 | 4 | Witco |
| Poly G-30-112 | 112 | 1500 | 3 | Olin |
| Poly G-76-120 | 110 | 1500 | 3 | Olin |
| Poly G-55-56 | 56 | 2000 | 2 | Olin |
| Poly G-20-28 | 28 | 4000 | 2 | Olin |
| Poly G-85-28 | 27 | 6500 | 3 | Olin |
| 588-186 | 60 | 1870 | 2 | JW |

TABLE A-continued

| Commercial Prod. | Avg. hydroxyl no. | Molecular Wt. | $f^a$ | Mfgr[b] |
|---|---|---|---|---|
| Res-D-2116 | 82 | 1370 | 2 | Herc |

[a]functionality, i.e., number of hydroxyl groups in the polyol, for example, f = 3 refers to a triol.
[b]Manufacturers. The abbreviations correspond to the following manufacturers:
UCC Union Carbide Corp., Danbury, Connecticut
ARCO ARCO, Newtown Square, Pennsylvania
Dow Dow Chemical Co., Midland, Michigan
Witco Witco Corporation, Chicago, Illinois
Olin Olin Chemicals, Stamford, Connecticut
JW Jim Walters, St. Petersburg, Florida
Herc Hercules, Inc., Wilmington, Delaware Any organic di or tri isocyanate can be used in the practice of the present invention. Diisocyanates are preferred. Examples of suitable organic polyisocyanates are trimethylene diisocyanate, tetramethylene diisocyanate, pentamethylene diisocyanate and hexamethylene diisocyanate. Examples of aromatic diisocyanates include 2,4 tolylene diisocyanate, and 2,6 tolylene diisocyanate. In addition, methylene diphenyldiisocyanates and polymeric isocyanates based on methylene diphenyldiisocyanates can be employed.

The tolylene diisocyanates (TDI) are monomeric and possess a high vapor pressure relative to the methylene diisocyanates (MDI), which are polymeric. The TDI vapors are very toxic and have a propensity of reacting once in a person's respiratory system. As such, TDI poses a handling problem and a health hazard. As a result, MDI is preferred for many applications, including plywood patch material.

The amount of polyisocyanate employed is greater than 1.00, and preferably ranges from greater than 1.00 to about 2.0, more preferably about 1.05 to about 1.7, moles of NCO in the polyisocyanate per mole of active hydrogen in the polyols.

In certain instances it may be desirable to add a chain extender to complete the formulation of polyurethane polymers by reacting isocyanate groups of adducts or prepolymers. Examples of some types of polyol chain extenders include 1,4 butanediol, diethylene glycol, trimethylol propane and hydroquinone di(beta hydroxyethyl ether).

The chain extender when present is added at about 1% w to about 20% w, preferably about 3% w to about 6% w based on the weight of the reactants.

Plywood-patch compositions may additionally incorporate diluents, fillers, compatibilizers, thixotropes, pigments and anti-settling agents. Suitable fillers include barium sulfate, calcium sulfate, calcium carbonate, silica, and clay particles, such as aluminum silicates, magnesium silicates and kaolin. Suitable compatibilizers are hydroxy containing organic compounds, preferably hydroxy containing monocyclic arenes such as ethoxylated nonyl phenol, which compatibilize the polyol and aromatic diisocyanate reactants in the formulation.

Suitable diluents include hydrotreated paraffinic oils, hydrotreated naphthenic oils, petroleum solvents, aliphatic solvents and propylene carbonate. An exemplary list of commercial available diluents is given in Table B below.

TABLE B

| Diluent | Flash Point (F.) | Manufacturer[a] |
|---|---|---|
| Propylene carbonate | 270 | Texaco; ARCO |
| Hydrotreated naphthenic oil: | | |
| Sunthene 204 | 265 | Sun |

TABLE B-continued

| Diluent | Flash Point (F.) | Manufacturer[a] |
|---|---|---|
| Hyprene V-60 Hydrotreated paraffinic oil: | 300 | Ergon |
| Sunpar 107 | 350 | Sun |
| Sunpar LW104 | 260 | Sun |
| Sunpar LW003 | 200 | Sun |
| Aromatic petroleum solvent: | | |
| Aromatic 100 | 108 | Exxon |
| Hisol-10 | 110 | Ashland |
| Petroleum Solvent: | | |
| Exxsol D110 | 221 | Exxon |
| Varsol 1 | 108 | Exxon |
| Varsol 18 | 106 | Exxon |
| Aliphatic solvents: | | |
| PD-23 | 225 | Witco |
| PD-25 | 225 | Witco |

[a]The abbreviations correspond to the following:
Texaco Texaco, Inc., Bellaire, Texas
ARCO ARCO, Newtown Square, Pennsylvania
Sun Sun Refining, Philadelphia, Pennsylvania
Exxon Exxon Chemical, Houston, Texas
Ashland Ashland Chemical, Columbus, Ohio
Witco Witco, Sonnaborn Division, NY, New York
Ergon Ergon, Jackson, Mississippi A preferred plywood-patch composition comprises two components—a component A and a component B wherein component A ranges from about 6 to about 15 parts to each part of B by volume. Component A comprises (a) from about 15 to about 40% w of a poly(oxyalkylene) polyol having a functionality of at least 3, preferably a poly(oxyalkylene) triol; (b) from 0 to about 16% w of poly(oxyalkylene)diol; (c) from 0 to about 2.5% w of a compatibilizer such as ethoxylated nonyl phenol; (d) from 0 to about 12% w of a non-reactive diluent; (e) from 0 to about 2% w of a desiccant such as micronized molecular sieve, preferably 0 to about 1% w; (f) from 0 to about 0.8% w of a thixotrope, more preferably from 0 to about 0.5% w; (g) from about 30 to about 70% w of a filler, more preferably from about 50 to about 65% w; (h) from 0 to about 2% w of a pigment, more preferably from about 0.05 to about 0.2% w; (i) from 0 to about 2% w of an anti-settling agent, more preferably from 0 to about 0.5% w; and (j) from about 0.1 to about 3% w of the co-catalyst system, wherein % w is based on the weight of Component A. In one embodiment, the poly(oxyalkylene) polyol having at least three (3) hydroxyl groups is a mixture of a first and a second poly(oxyalkylene)triol, wherein the first poly(oxyalkylene)triol is present from about 15 to about 30% w and has a molecular weight from about 1,000 to less than 3,000 and a hydroxyl number from about 60 to about 150 and the second poly(oxyalkylene)triol is present from about 5 to about 15% w and has a molecular weight from about 3,000 to about 10,000, and a hydroxyl number from about 30 to about 100, preferably with no poly(oxyalkylene)diol, wherein % w is based on the weight of Component A. In another embodiment, the poly(oxyalkylene) polyol having at least three (3) hydroxyl groups is a poly(oxyalkylene)triol and is present from about 15 to about 30% w and has a molecular weight from about 1,000 to about 5,000 and a hydroxyl number from about 60 to about 150 and a poly(oxyalkylene)diol is present from about 5 to about 15% w and has a molecular weight from about 1,000 to about 5,000 and a hydroxyl number from about 30 to about 100, wherein % w is based on the weight of Component A.

The component B of the plywood-patch composition is preferably entirely methylene diphenyl diisocyanate, though mixtures of diisocyanates are also permissible. Additionally, chain extenders including that amount utilized as a solvent in the catalyst solution may be present from 0 to about 5% w, preferably from 0 to about 2% w, based on the weight of Component A. Chain extenders in excess of these amounts have an adverse affect on adhesion (American Plywood Association boil test) and hardness (Shore A Durometer Hardness).

EXAMPLES

The following examples are for illustrative purposes only and are not meant to limit the claimed invention in any manner. The following tests have been utilized in some of the examples that follow:

(1) Flowability: The flowability of the chemicals relates to how well the chemicals process through the mixing/metering equipment and how they flow to fill surface defects, for example, voids, cracks, knot-holes, splits, and the like, in the plywood panels. For the mixed chemicals, flowability relates to two phenomena. First, the initial flowability which is related to the viscosity of the chemicals initially and which can be measured on a Brookfield viscometer under high spindle speeds (i.e., the #4 spindle @ 60 rpm's for a model LVF Brookfield). Chemicals of 3000 cps or less will have good initial flowability for this application. Secondly, as the chemicals react, the viscosity changes. With an increase in viscosity due to the crosslinking reaction between the isocyanate and polyol, the flowability of the chemicals decreases until the gel point is reached, at which time flow stops. Generally speaking, gel times of 17 to 18 seconds or longer result in good flowability. Gel times of less than 17 seconds lead to poor flowability.

(2) Gel time is the point in time from the initial reaction of the chemicals until the viscosity has increased sufficiently so no flow occurs or when the polymer has crosslinked sufficiently to form a permanent shape. The gel time of the chemicals relates to mixing gun tube plugging and tube replacement costs. The desired gel time is one that is as close to the tack free time as possible as to maximize flowability.

(3) Tack Free Time is defined as the time from initial mixing until the surface of the urethane mass loses its stickiness or adhesive quality as measured by touching the surface with a tongue depressor or one's finger tip. Tack free time relates to how quickly the plywood patch cures on the plywood board such that the boards do not stick together during the stacking operation at the end of the plywood patch operating line.

(4) Shore A durometer hardness test per ASTM D-2240-75, "Rubber Property-Durometer Hardness". Shore A durometer hardness versus time relates to how quickly the patch cures on the board so that it resists damage during stacking, handling, sanding and other plant operations.

(5) Adhesion. A point in time when the urethane mass adheres to the surface of a plywood panel and cannot be removed by pulling at the edges with one's fingernail or by thumb pressure. Adhesion is a property that is very important in terms of the synthetic patch remaining in the filled defect area as the boards are sanded. The quicker the adhesion times the more likely the patch will remain in the defect.

In the following examples, the plywood-patch formulation shown in TABLE 1 was utilized, unless otherwise specified. In preparing Component A, various amounts and types of catalyst and co-catalysts were added to about 100 grams of the base composition shown in TABLE 1 and mixed thoroughly. Component A was then combined with component B in the proportion of about 10 parts by volume of component A to one part of by volume of component B, which corresponded to the addition of about 8 grams of MDI. Components A and B were mixed under high speed agitation for about 10 seconds. The mixture was then poured onto the surface of an unsanded plywood panel at about room temperature, about 73° F. Each mixture (sample) was tested for flowability of the mixture onto the panel, gel time in seconds, tack free time in seconds, adhesion to the wood surface in seconds, and the curing hardness profile as measured by Shore A durometer with time as the variable.

TABLE 1

Plywood-Patch Composition Formulation

Ingredients
Component A:

| 1. Base composition | Percent by Weight |
|---|---|
| Poly(oxyalkylene) triol[a] | 18.4 |
| Poly(oxyalkylene) triol[b] | 13.3 |
| Diluent[c] | 5.3 |
| Anti-settling agent[d] | 0.2 |
| Thixotrope[e] | 0.4 |
| Desiccant[f] | 1.0 |
| Filler[g] | 61.3 |
| Pigment[h] | 0.1 |
| 2. Catalyst or catalyst solution | Varied |

Component B:

| Methylene diphenyl diisocyanate (MDI) | |
|---|---|
| Ratio A to B (parts by volume): | 10 to 1 |

[a] A triol having a molecular weight of about 1500 and hydroxyl number of about 120.
[b] A triol having a molecular weight of about 4800 and a hydroxyl number of about 34.
[c] An aromatic petroleum solvent having 100% aromatic content and having a flash point of about 105° F. and a boiling point of about 308° F.
[d] Anti-Terra ® - U80 available from BYK Chemie USA, Wallingford, Conn. and described as a solution of a salt of unsaturated polyamine amide and higher molecules of acidic esters.
[e] Cab-O-Sil Type M5 available from Cabot Corporation; a fumed silica.
[f] Molecular Sieve Type 4A is powder form available from Union Carbide Corporation, Tarrytown, New York, having a nominal pore diameter of about 4 angstroms.
[g] Wingdale White available from Georgia Marble Co., Atlanta, Ga., a calcium carbonate having a mean particle size of about 6 microns.
[h] Yellow iron oxide commercially available as Mapico Yellow 1075A from Columbian Chemicals Co., Atlanta, Ga.

The catalysts or catalyst solutions shown in Table 2 were used in the following examples:

TABLE 2

| Catalyst Code | Description |
|---|---|
| A | Catalyst 320 available from Mooney Chemicals, Inc., Cleveland, Ohio, is a catalyst solution containing about 78% by weight bismuth 2-ethylhexoate and about 22% by weight mineral spirits and contains about 28% by weight bismuth. |
| B | 22% Zinc Hex Chem available from Mooney Chemicals, Inc. is a catalyst composed of 100% zinc octoate (zinc 2-ethylhexoate) and contains about 22% by weight zinc. |
| C | 18% Antimony Hex Chem available from Mooney Chemicals, Inc. is a catalyst solution containing about 98% by weight antimony 2-ethylhexoate and about 2% by weight mineral spirits and contains about 18% by weight antimony. |
| D | 2% Lithium Ten-Cem HF available from Mooney Chemicals, Inc., is a catalyst solution containing about 57% by weight lithium neodecanoate and about 43% by weight diethylene glycol monobutyl ether and contains about 2% by weight lithium. |

EXAMPLE 1: Sole Catalysts

In this example, various catalysts were utilized alone with the base composition of Component A. The metals in these catalysts were bismuth (Bi), zinc (Zn), antimony (Sb) and lithium (Li).

As indicated in Table 3, the bismuth catalyst solution (Sample No. 1-1) reacts and gels quite quickly and, as a result, flowability of the plywood patch formulation is very poor.

As for the zinc-, antimony- and lithium-based catalysts, none of these catalysts produced an acceptable plywood patch as measured by the reactivity profile (Shore A hardness vs. time). An acceptable plywood patching formulation would be one for which reaction and curing begin within about 30±3 seconds. At the catalyst levels of about 0.41 to 0.42 parts of catalysts or catalysts solution per 100 parts of the base composition of Component A (pph) (Samples No. 1-2, 1-4 and 1-6), all three catalyst types took well over 200 seconds for any reaction to occur, and then only the lithium-based catalyst showed any promise with a final cure hardness of 72 as measured by Shore A after 3000 seconds (50 minutes). The antimony-based catalyst produced a foaming patch which did not cure and remained tacky and spongy well past 3000 seconds. The zinc-based catalyst likewise showed a very slow reaction with very little activity until about 1400 seconds. Additionally, the concentration of zinc-, antimony-, and lithium-based catalyst or catalyst-solution used separately had to be increased greatly to between 2.5 to 6.0 pph levels to get any type of reaction to occur. These catalysts separately did not produce acceptable patch formulations and at these concentration levels would be cost prohibitive to use.

TABLE 3

(Sole Catalyst)

| Sample No. | 1-1 | 1-2 | 1-3 | 1-4 | 1-5 | 1-6 | 1-7 |
|---|---|---|---|---|---|---|---|
| Catalyst Level[a]/Catalyst | 0.26/A | 0.42/B | 2.5/B | 0.42/C | 2.5/C | 0.41/D | 6.0/D |
| Metal | Bi | Zn | Zn | Sb | Sb | Li | Li |
| Moles of Metal | $3.48 \times 10^{-6}$ | $1.4 \times 10^{-5}$ | $8.4 \times 10^{-5}$ | $6 \times 10^{-6}$ | $3.7 \times 10^{-5}$ | $1.2 \times 10^{-5}$ | $1.7 \times 10^{-4}$ |
| Flowability | very poor | good | good | good | excellent | good | good |
| Gel Time (sec.) | 14 | none | 380 | none | 50 | 180 | 80 |
| Tack Free Time (sec.) | 22 | 1300 | 450 | 2700 | 60 | 220 | 150 |
| Shore A Hardness | | | | | | | |
| 80 sec. | 48 | none | — | none | 5 | none | — |
| 100 sec. | 50 | none | — | none | 6 | none | — |
| 120 sec. | 53 | none | — | none | — | none | — |

TABLE 3-continued (Sole Catalyst)

| | | | | | | | |
|---|---|---|---|---|---|---|---|
| 150 sec. | 56 | none | — | none | — | none | — |
| 175 sec. | 58 | none | — | none (foam) | — | none | — |
| 200 sec. | 62 | none | — | none | 20 | none | — |
| 250 sec. | 68 | none | — | none | — | 19 | — |
| 300 sec. | 69 | none | — | none | — | 28 | 28 |
| 400 sec. | 72 | none | — | none | 25 | 36 | — |
| 500 sec. | 74 | none | — | none | — | 45 | — |
| 600 sec. | 76 | none | — | none | — | 50 | — |
| 800 sec. | — | none | — | none | — | 58 | — |
| 1000 sec. | — | none | — | none | — | 60 | — |
| 1400 sec. | — | 20 | — | none | — | — | — |
| 2000 sec. | — | — | — | none | — | 68 | — |
| 2500 sec. | — | 36 | — | none | — | 70 | — |
| 3000 sec. | — | 42 | 20/15 min. | spongy | 32/30 min. | 72 | 40/30 min. |
| Adhesion Time (sec.) | 556 | 2175 | 1800 | none (foam) | none | 2300 | 1800 |
| Comments | Sticky | | No Foam | | Foam | | No foam |

[a] parts catalyst or catalyst solution per 100 parts of base composition of Component A.
"—" denotes test not performed.

EXAMPLE 2: Bismuth/Zinc Co-catalyst System

In this example, various ratios of bismuth-based catalyst to zinc-based catalyst were utilized with the base composition of Component A. The weight ratio of the bismuth-based catalyst solution to the zinc-based catalyst ranged from about 20:80 to about 90:10 which corresponds to a mole ratio range of bismuth to zinc metal of about 1:10 to about 1:0.25.

tion tack free time starts to become too slow for on-line processing and could result in a soft patch which may cause boards to stick together when stacked. Thus, to produce a most acceptable plywood patch formulation utilizing a co-catalyst system using a bismuth-based catalyst and a zinc-based catalyst, the bismuth and zinc metals therein should be present such that the mole ratio of bismuth metal to zinc metal is from about 1:4 to about 1:1.

TABLE 4

(Bismuth/Zinc)

| Sample No. | 2-1 | 2-2 | 2-3 | 2-4 | 2-5 | 2-6 | 2-7 | 2-8 |
|---|---|---|---|---|---|---|---|---|
| Ratio A/B Catalyst | 20/80 | 30/70 | 40/60 | 50/50 | 62.5/37.5 | 70/30 | 75/25 | 90/10 |
| A Catalyst Level[a] | .084 | .126 | .168 | .21 | .26 | .294 | .315 | .378 |
| B Catalyst Level[a] | .336 | .294 | .252 | .21 | .15 | .126 | .105 | .040 |
| Moles of Metal: | | | | | | | | |
| Bi | $1.1 \times 10^{-6}$ | $1.7 \times 10^{-6}$ | $2.25 \times 10^{-6}$ | $2.8 \times 10^{-6}$ | $3.48 \times 10^{-6}$ | $3.9 \times 10^{-6}$ | $4.2 \times 10^{-6}$ | $5.1 \times 10^{-6}$ |
| Zn | $1.13 \times 10^{-5}$ | $9.9 \times 10^{-6}$ | $8.5 \times 10^{-6}$ | $7.1 \times 10^{-6}$ | $5.05 \times 10^{-6}$ | $4.24 \times 10^{-6}$ | $3.5 \times 10^{-6}$ | $1.3 \times 10^{-6}$ |
| Mole Ratio of Bi:Zn | 1:10 | 1:5.8 | 1:3.8 | 1:2.5 | 1:1.5 | 1:1.1 | 1:0.8 | 1:0.25 |
| Flowability | Real good | good | good | good | good | good | poor | poor |
| Gel Time (sec.) | 72 | 36 | 26 | 27 | 21 | 20 | 16 | 16 |
| Tack Free Time (sec.) | 92 | 56 | 42 | 44 | 28 | 34 | 25 | 23 |
| Shore A Hardness | | | | | | | | |
| 80 sec. | — | 42 | 40 | 32 | 42 | 40 | 55 | 52 |
| 100 sec. | 15 | 47 | 48 | 40 | 47 | 48 | 60 | 58 |
| 120 sec. | 22 | 53 | 55 | 46 | 57 | 56 | 62 | 61 |
| 150 sec. | 38 | 60 | 58 | 53 | 59 | 58 | 66 | 65 |
| 175 sec. | 44 | 62 | 64 | 55 | 62 | 61 | 70 | 65 |
| 200 sec. | 50 | 66 | 65 | 60 | 64 | 63 | 73 | 67 |
| 250 sec. | 54 | 70 | 68 | 64 | 66 | 66 | 77 | 69 |
| 300 sec. | 58 | 71 | 72 | 68 | 71 | 67 | 78 | 70 |
| 400 sec. | 64 | 74 | 73 | 72 | 73 | 70 | 79 | 72 |
| 500 sec. | 70 | 77 | 74 | 75 | 75 | 73 | 80 | 73 |
| 600 sec. | 74 | 79 | 76 | 76 | 78 | 75 | 80 | 76 |
| Adhesion Time (sec.) | 165 | 95 | 90 | 110 | 240 | 180 | 160 | 155 |
| Comments | Tack free too slow | Good adhesion; tack free too slow | Appears acceptable | Would be acceptable | Acceptable | Acceptable but beginning to gel too quickly | Gels too fast | Gels too fast |

[a] Parts of catalyst or catalyst solution per 100 parts of base composition of component A.

As indicated in Table 4, an acceptable plywood patch formulation was one having a bismuth-based catalyst solution to zinc-based catalyst weight ratio ranging from about 40:60 to about 70:30, which corresponds to a mole ratio range of bismuth to zinc metal of about 1:3.8 to about 1:1.1. Above about 70:30 weight ratio (mole ratio of bismuth to zinc of about 1:1.1), the plywood patch formulation tends to gel too quickly for adequately processing it through the mixing equipment. Whereas below the 40:60 weight ratio (mole ratio of bismuth to zinc metal of about 1:3.8), the patch formula-

EXAMPLE 3: Bismuth/Antimony Co-catalyst System

In this example, various ratios of bismuth-based catalyst to antimony-based catalyst were utilized with the base composition of Component A. The weight ratio of the bismuth-based catalyst solution to the antimony-based catalyst solution ranged from about 25:75 to about 80:20, which corresponds to a mole ratio range of bismuth to antimony metal of about 1:3.5 to about 1:0.3.

As indicated in Table 5, an acceptable plywood patch formulation is one having a bismuth-based catalyst solution to antimony-based catalyst solution ranging from about 50:50 to about 75:25, which corresponds to a mole ratio range of bismuth to antimony of about 1:1.1 to about 1:0.4. Below the 50:50 weight ratio (mole ratio of bismuth to antimony of 1:1.1), the reaction tends to proceed too slowly to be processable at a rapid rate and no adhesion occurred even after 30 minutes. Above the 75:25 weight ratio (mole ratio of bismuth to antimony of 1:0.4), the reaction tends to occur too fast for desired processability and did not achieve a good flow into defect areas on the plywood board. Thus, to produce a most acceptable plywood patch formulation utilizing a co-catalyst system using a bismuth-based catalyst and an antimony-based catalyst, the bismuth and antimony metals therein must be present such that the mole ratio of bismuth metal to antimony metal is from about 1:1.1 to about 1:0.4.

catalyst ranged from about 25:75 to about 75:25, which corresponds to a mole ratio range of bismuth to lithium metal of about 1:6.6 to about 1:0.7.

As indicated in Table 6, an acceptable plywood patch formulation was one having a bismuth-based catalyst solution to lithium-based catalyst solution ranging from about 25:75 to about 57:43, which corresponds to a mole ratio range of bismuth to lithium metal of about 1:6.6 to about 1:1.65. At the 25:75 weight ratio, the adhesion of the reacted plywood patch formulation to the plywood board tends to be too slow (about 10 minutes). This would require an extended cure of the plywood boards or panels before they are processed further in a processing plant, which may or may not be acceptable to some existing plant operations. Weight ratios of 60:40 or higher produce fast reacting formulations which make it difficult to process in plant operations and tend to affect flowability into defect areas of the plywood board. Thus, to produce a most acceptable plywood

TABLE 5

| | (Bismuth/Antimony) | | | | | | |
|---|---|---|---|---|---|---|---|
| Sample No. | 3-1 | 3-2 | 3-3 | 3-4 | 3-5 | 3-6 | 3-7 |
| Ratio A/C Catalyst | 25/75 | 30/70 | 40/60 | 50/50 | 60/40 | 75/25 | 80/20 |
| A Catalyst Level[a] | .085 | .102 | .136 | .17 | .204 | .255 | .27 |
| C Catalyst Level[a] | .255 | .238 | .204 | .17 | .136 | .085 | .07 |
| Moles of Metal: | | | | | | | |
| Bi | $1.1 \times 10^{-6}$ | $1.4 \times 10^{-6}$ | $1.8 \times 10^{-6}$ | $2.3 \times 10^{-6}$ | $2.7 \times 10^{-6}$ | $3.4 \times 10^{-6}$ | $3.6 \times 10^{-6}$ |
| Sb | $3.8 \times 10^{-6}$ | $3.5 \times 10^{-6}$ | $3.0 \times 10^{-6}$ | $2.5 \times 10^{-6}$ | $2.0 \times 10^{-6}$ | $1.26 \times 10^{-6}$ | $1.04 \times 10^{-6}$ |
| Mole Ratio of Bi:Sb | 1:3.5 | 1:2.5 | 1:1.67 | 1:1.1 | 1:0.75 | 1:0.4 | 1:0.3 |
| Flowability | good | good | excellent | good | good | good | poor |
| Gel Time (sec.) | 54 | 50 | 40 | 20 | 20 | 20 | 15 |
| Tack Free Time (sec.) | 105 | 80 | 66 | 38 | 32 | 33 | 24 |
| Shore A Hardness | | | | | | | |
| 80 sec. | — | — | 5 | 20 | 41 | 40 | 48 |
| 100 sec. | — | 5 | 5 | 34 | 48 | 45 | 58 |
| 120 sec. | 5 | 18 | 20 | 43 | 50 | 50 | 64 |
| 150 sec. | 10 | 26 | 28 | 47 | 55 | 54 | 70 |
| 175 sec. | 13 | 32 | 38 | 52 | 57 | 58 | 70 |
| 200 sec. | 30 | 40 | 40 | 56 | 60 | 61 | 72 |
| 250 sec. | 42 | 45 | 46 | 58 | 63 | 65 | 73 |
| 300 sec. | 44 | 50 | 53 | 60 | 65 | 66 | 73 |
| 400 sec. | 50 | 55 | 55 | 63 | 69 | 71 | 75 |
| 500 sec. | 56 | 59 | 57 | 65 | 71 | 72 | 77 |
| 600 sec. | 58 | 62 | 63 | 68 | 72 | 73 | 77 |
| Adhesion Time (sec.) | none | none | 750+ | 230 | 200 | 210 | 175 |
| Comments | Slow reacting. Sticky. No adhesion. | Slow, sticky. No adhesion. | Soft and sticky. Slow adhesion. | Reacts ok. Shore A = 72 max. | Reacts ok. | Reacts ok. | Gels too fast |

[a]Parts of catalyst or catalyst solution per 100 parts of base composition of Component A.

EXAMPLE 4: Bismuth/Lithium Co-catalyst System

In this example, various ratios of bismuth-based catalyst to lithium-based catalyst were utilized with the base composition of Component A. The weight ratio of the bismuth-based catalyst solution to the lithium-based catalyst ranged from about 25:75 to about 75:25, which corresponds to a mole ratio range of bismuth to lithium metal of about 1:6.6 to less than about 1:1.6 (i.e. more lithium per mole of bismuth).

patch formulation utilizing a co-catalyst system using a bismuth-based catalyst and a lithium-based catalyst, the bismuth and lithium metal therein must be present such that the mole ratio of bismuth metal to lithium metal is from about 1:6.6 to less than about 1:1.6 (i.e. more lithium per mole of bismuth).

TABLE 6

| | (Bismuth/Lithium) | | | | | |
|---|---|---|---|---|---|---|
| Sample No. | 4-1 | 4-2 | 4-3 | 4-4 | 4-5 | 4-6 |
| Ratio A/D Catalyst | 25/75 | 40/60 | 50/50 | 57/43 | 60/40 | 75/25 |
| A Catalyst Level[a] | .115 | .184 | .23 | .26 | .276 | .345 |
| D Catalyst Level[a] | .345 | .276 | .23 | .20 | .184 | .115 |
| Moles of Metal: | | | | | | |
| Bi | $1.5 \times 10^{-6}$ | $2.5 \times 10^{-6}$ | $3.1 \times 10^{-6}$ | $3.5 \times 10^{-6}$ | $3.7 \times 10^{-6}$ | $4.6 \times 10^{-6}$ |
| Li | $9.9 \times 10^{-6}$ | $7.96 \times 10^{-6}$ | $6.6 \times 10^{-6}$ | $5.8 \times 10^{-6}$ | $5.3 \times 10^{-6}$ | $3.3 \times 10^{-6}$ |
| Mole Ratio of Bi:Li | 1:6.6 | 1:3.2 | 1:2.1 | 1:1.65 | 1:1.4 | 1:0.7 |
| Flowability | excellent | good | fair | excellent | poor | poor |
| Gel Time (sec.) | 33 | 20 | 20 | 22 | 16 | 16 |
| Tack Free Time (sec.) | 43 | 32 | 28 | 33 | 22 | 21 |

TABLE 6-continued (Bismuth/Lithium)

| Shore A Hardness | | | | | | |
|---|---|---|---|---|---|---|
| 80 sec. | 42 | 48 | 50 | 40 | 50 | 49 |
| 100 sec. | 48 | 54 | 56 | 48 | 58 | 60 |
| 120 sec. | 55 | 59 | 60 | 52 | 64 | 63 |
| 150 sec. | 56 | 63 | 64 | 56 | 65 | 66 |
| 175 sec. | 58 | 65 | 66 | 60 | 67 | 68 |
| 200 sec. | 61 | 65 | 69 | 63 | 70 | 70 |
| 250 sec. | 64 | 68 | 70 | 65 | 72 | 71 |
| 300 sec. | 66 | 70 | 72 | 66 | 73 | 73 |
| 400 sec. | 70 | 72 | 73 | 70 | 74 | 75 |
| 500 sec. | 73 | 74 | 74 | 71 | 75 | 78 |
| 600 sec. | 75 | 76 | 78 | 73 | 75 | 81 |
| Adhesion Time (sec.) | 550 | 375 | 300 | 400 | 275 | 170 |
| Comments | Slow reactivity. Slow adhesion. | Acceptable reactivity. Slow adhesion. | Would make acceptable patch. | Rubbery | Gels too fast. | Gels too fast. |

*Parts of catalyst or catalyst solution per 100 parts of base composition of Component A.

The reaction product of isocyanates and polyols and other hydroxyl containing compounds utilizing the co-catalyst system of the present invention may be further utilized as elastomers, coatings, foundry resins, adhesives, urethane-isocyanate sealants and caulkings, carpet backings and any structural polymers which incorporate such reaction products.

It will be apparent from the foregoing that many other variations and modifications may be made in the processes and the compositions hereinbefore described, by those having experience in this technology, without departing from the concept of the present invention. Accordingly, it should be clearly understood that the processes and compositions referred to in the foregoing description are illustrative only and are not intended to have any limitations on the scope of the invention.

I claim:

1. A process for preparing a polyurethane elastomer consisting essentially of the step of reacting a polyol selected from polyether polyols and polyester polyols with an organic polyisocyanate wherein the ratio of NCO groups to hydroxyl groups is greater than about 1.00 to 1 in the presence of a catalytic amount of a co-catalyst system, said co-catalyst system consisting essentially of an organo-bismuth compound and at least one organo-metallic compound, wherein said at least one organo-metallic compound contains a metal selected from the group consisting of zinc, antimony, lithium and combinations thereof and wherein the bismuth contained in said organo-bismuth compound and said metal contained in said organo-metallic compound are present in an effective mole ratio of bismuth to said metal, with the proviso that if said metal is zinc then said effective mole ratio is from about 1:4 to about 1:1, with the proviso that if said metal is antimony then said effective mole ratio is from about 1:1.1 to about 1:0.4, and with the proviso that if said metal is lithium then said effective mole ratio is from about 1:6.6 to less than about 1:1.6.

2. The process according to claim 1, wherein said organo-bismuth compound is a bismuth salt of a first carboxylic acid having from 2 to about 20 carbon atoms in the molecule.

3. The process according to claim 2, wherein said organo-metallic compound is a metal salt of a second carboxylic acid having from 2 to about 20 carbon atoms in the molecule.

4. The process according to claim 1, wherein the metal is zinc.

5. The process according to claim 4, wherein the mole ratio of bismuth to zinc is from about 1:4 to about 1:1.

6. The process according to claim 1, wherein the metal is antimony.

7. The process according to claim 6, wherein the mole ratio of bismuth to antimony is from about 1:1.1 to about 1:0.4.

8. The process according to claim 1, wherein the metal is lithium.

9. The process according to claim 8, wherein the mole ratio of bismuth to lithium is from about 1:6.6 to less than about 1:1.6.

10. The process according to claim 1 wherein the polyol has a molecular weight of about 1,000 to about 10,000.

11. The process according to claim 1 wherein the reaction is performed in the presence of about 0.1 to about 3% w, based on the weight of the reactants, of said co-catalyst system.

12. A process for preparing a polyurethane elastomer consisting essentially of the step of reacting a polyol selected from polyether polyols and polyester polyols with an organic polyisocyanate, in the presence of an effective amount of a chain extender, wherein the ratio of NCO groups to hydroxyl groups is greater than about 1.00 to 1 in the presence of a catalytic amount of a co-catalyst system, said co-catalyst system consisting essentially of an organo-bismuth compound and at least one organo-metallic compound, wherein said at least one organo-metallic compound contains a metal selected from the group consisting of zinc, antimony, lithium and combinations thereof and wherein the bismuth contained in said organo-bismuth compound and said metal contained in said organo-metallic compound are present in an effective mole ratio of bismuth to said metal, with the proviso that if said metal is zinc then said effective mole ratio is from about 1:4 to about 1:1, with the proviso that if said metal is antimony then said effective mole ratio is from about 1:1.1 to about 1:0.4, and with the proviso that if said metal is lithium then said effective mole ratio is from about 1:6.6 to less than about 1:1.6.

13. The process according to claim 12, wherein said organo-bismuth compound is a bismuth salt of a first carboxylic acid having from 2 to about 20 carbon atoms in the molecule.

14. The process according to claim 13, wherein said organo-metallic compound is a metal salt of a second carboxylic acid having from 2 to about 20 carbon atoms in the molecule.

15. The process according to claim 12, wherein the metal is zinc.

16. The process according to claim 15, wherein the mole ratio of bismuth to zinc is from about 1:4 to about 1:1.

17. The process according to claim 12, wherein the metal is antimony.

18. The process according to claim 17, wherein the mole ratio of bismuth to antimony is from about 1:1.1 to about 1:0.4.

19. The process according to claim 12, wherein the metal is lithium.

20. The process according to claim 19, wherein the mole ratio of bismuth to lithium is from about 1:6.6 to less than about 1:1.6.

21. The process according to claim 12 wherein the polyol has a molecular weight of about 1,000 to about 10,000.

22. The process according to claim 12 wherein the reaction is performed in the presence of about 0.1 to about 3% w, based on the weight of the reactants, of said co-catalyst system and from about 1% w to about 20% w based on the weight of the reactants of a chain extender.

23. A plywood-patch composition based on a non-cellular polyurethane elastomer, said plywood-patch composition comprising the reaction product of a Component A and a Component B in the presence of a catalytic amount of a co-catalyst system,
wherein said Component A comprises
 (a) from about 15 to about 40% w of a poly(oxyalkylene) polyol having at least three (3) hydroxyl groups,
 (b) from 0 to about 16% w of a poly(oxyalkylene)-diol,
 (c) from 0 to about 2.5% w of a compatibilizer for said Component A and said Component B,
 (d) from 0% w to about 12% w of a non-reactive diluent for said Component A,
 (e) from 0 to about 2% w of a desiccant,
 (f) from 0 to about 1% w of a thixotrope,
 (g) from about 30 to about 70% w of a filler,
 (h) from 0 to about 2% w of a pigment, and
 (i) from 0 to about 2% w of an anti-settling agent,
wherein % w is based on Component A,
wherein Component B is an organic polyisocyanate,
wherein the ratio of NCO groups to hydroxyl groups is greater than about 1.00 to 1 and
wherein said co-catalyst system consists essentially of an organo-bismuth compound and at least one organo-metallic compound, wherein said at least one organo-metallic compound contains a metal selected from the group consisting of zinc, antimony and lithium and wherein the bismuth contained in said organo-bismuth compound and said metal contained in said organo-metallic compound are present in an effective mole ratio of bismuth to said metal, with the proviso that if said metal is zinc then said effective mole ratio is from about 1:4 to about 1:1, with the proviso that if said metal is antimony then said effective mole ratio is from about 1:1.1 to about 1:0.4, and with the proviso that if said metal is lithium then said effective mole ratio is from about 1:6.6 to less than about 1:1.6.

24. The composition according to claim 23, wherein said organo-bismuth compound is a bismuth salt of a first carboxylic acid having from 2 to about 20 carbon atoms in the molecule.

25. The composition according to claim 24, wherein said organo-metallic compound is a metal salt of a second carboxylic acid having from 2 to about 20 carbon atoms in the molecule.

26. The composition according to claim 23, wherein the metal is zinc.

27. The composition according to claim 26, wherein the mole ratio of bismuth to zinc is from about 1:4 to about 1:1.

28. The composition according to claim 23, wherein the metal is antimony.

29. The composition according to claim 28, wherein the mole ratio of bismuth to antimony is from about 1:1.1 to about 1:0.4.

30. The composition according to claim 23, wherein the metal is lithium.

31. The composition according to claim 30, wherein the mole ratio of bismuth to lithium is from about 1:6.6 to less than about 1:1.6.

32. The plywood-patch composition according to claim 23 wherein the poly(oxyalkylene) polyol having at least three (3) hydroxyl groups is a mixture of a first and a second poly(oxyalkylene)triol, wherein said first poly(oxyalkylene)triol is present from about 15 to about 30% w and has a molecular weight from about 1,000 to less than 3,000 and a hydroxyl number from about 60 to about 150 and wherein said second poly(oxyalkylene)-triol is present from about 5 to about 15% w and has a molecular weight from about 3,000 to about 10,000 and a hydroxyl number from about 30 to about 100.

33. The plywood-patch composition according to claim 23 wherein the poly(oxyalkylene) polyol having at least three (3) hydroxyl groups is a poly(oxyalkylene)triol and is present from about 15 to about 30% w and has a molecular weight of from about 1,000 to about 5,000 and a hydroxyl number from about 60 to about 150 and wherein the poly(oxyalkylene)diol is present from about 5% to about 15% w and has a molecular weight of between 1,000 and about 5,000 and a hydroxyl number from about 30 to about 100.

34. A process for preparing a plywood-patch composition based on a non-cellular polyurethane elastomer consisting essentially of the step of reacting a Component A and a Component B in the presence of a catalytic amount of a co-catalyst system, wherein said Component A is prepared by mixing
 (a) from about 15 to about 40% w of a poly(oxyalkylene)polyol having at least three hydroxyl groups,
 (b) from 0 to about 16% w of a poly(oxyalkylene)-diol,
 (c) from 0 to about 2.5% w of a compatibilizer for said Component A and said Component B,
 (d) from 0 to about 12% w of a non-reactive diluent for said Component A,
 (e) from 0 to about 2% w of a desiccant,
 (f) from 0 to about 1% w of a thixotrope,
 (g) from about 30 to about 70% w of a filler,
 (h) from 0 to about 2% w of a pigment, and
 (i) from 0 to about 2% w of an anti-settling agent,
wherein % w is based on Component A,
wherein Component B is an organic polyisocyanate,
wherein the ratio of NCO groups to hydroxyl groups is greater than about 1.00 to 1 and
wherein said co-catalyst system consists essentially of an organo-bismuth compound and at least one organo-metallic compound, wherein said at least one organo-metallic compound contains a metal selected from the group consisting of zinc, antimony and lithium and wherein the bismuth contained in said organo-bismuth compound and said metal contained in said organo-metallic compound are present in an effective mole ratio of bismuth to said metal, with the proviso that if said metal is zinc then said effective mole ratio is from about 1:4 to about 1:1, with the proviso that if said metal is antimony then said effective mole ratio is from about 1:1.1 to about 1:0.4, and with the proviso that if said metal is lithium then said effective mole ratio is from about 1:6.6 to less than about 1:1.6.

35. The process according to claim 34, wherein said organo-bismuth compound is a bismuth salt of a first carboxylic acid having from 2 to about 20 carbon atoms in the molecule.

36. The process according to claim 35, wherein said organo-metallic compound is a metal salt of a second carboxylic acid having from 2 to about 20 carbon atoms in the molecule.

37. The process according to claim 34, wherein the metal is zinc.

38. The process according to claim 37, wherein the mole ratio of bismuth to zinc is from about 1:4 to about 1:1.

39. The process according to claim 34, wherein the metal is antimony.

40. The process according to claim 39, wherein the mole ratio of bismuth to antimony is from about 1:1.1 to about 1:0.4.

41. The process according to claim 34, wherein the metal is lithium.

42. The process according to claim 41, wherein the mole ratio of bismuth to lithium is from about 1:6.6 to less than about 1:1.6.

43. The process according to claim 34 wherein the poly(oxyalkylene) polyol having at least three (3) hydroxyl groups is a mixture of a first and a second poly(oxyalkylene)triol, wherein the first poly(oxyalkylene)triol is present from about 15 to about 30% w and has a molecular weight from about 1,000 to less than 3,000 and a hydroxyl number from about 60 to about 150 and wherein the second poly(oxyalkylene)triol is present from about 5 to about 15% w and has molecular weight from about 3,000 to about 10,000 and a hydroxyl number from about 30 to about 100.

44. The process according to claim 34 wherein the poly(oxyalkylene) polyol having at least three (3) hydroxyl groups is a poly(oxyalkylene)triol and is present from about 15 to about 30% w and has a molecular weight from about 1,000 to about 5,000 and a hydroxyl number from about 60 to about 150 and wherein the poly(oxyalkylene)diol is present from about 5 to about 15% w and has a molecular weight from about 1,000 to about 5,000 and a hydroxyl number from about 30 to about 100.

45. A co-catalyst system for preparing a polyurethane elastomer from a polyol selected from polyether polyols and polyester polyols and an organic polyisocyanate, said co-catalyst system consisting essentially of an organo-bismuth compound and at least one organo-metallic compound, wherein said at least one organo-metallic compound contains a metal selected from the group consisting of zinc, antimony, lithium and combinations thereof and wherein the bismuth contained in said organo-bismuth compound and said metal contained in said organo-metallic compound are present in an effective mole ratio of bismuth to said metal, with the proviso that if said metal is zinc then said effective mole ratio is from about 1:4 to about 1:1, with the proviso that if said metal is antimony then said effective mole ratio is from about 1:1.1 to about 1:0.4 and with the proviso that if said metal is lithium then said effective mole ratio is from about 1:6.6 to less than about 1:1.6.

46. The co-catalyst system according to claim 45, wherein said organo-bismuth compound is a bismuth salt of a first carboxylic acid having from 2 to about 20 carbon atoms in the molecule.

47. The co-catalyst system according to claim 46, wherein said organo-metallic compound is a metal salt of a second carboxylic acid having from 2 to about 20 carbon atoms in the molecule.

48. The co-catalyst system according to claim 1, wherein the metal is zinc.

49. The co-catalyst system according to claim 45, wherein the metal is antimony.

50. The co-catalyst system according to claim 45, wherein the metal is lithium.

* * * * *